May 15, 1956 C. P. HAAS 2,745,668
SPINDLE AND SLIDE CONTROL ASSEMBLY
Filed Oct. 17, 1951
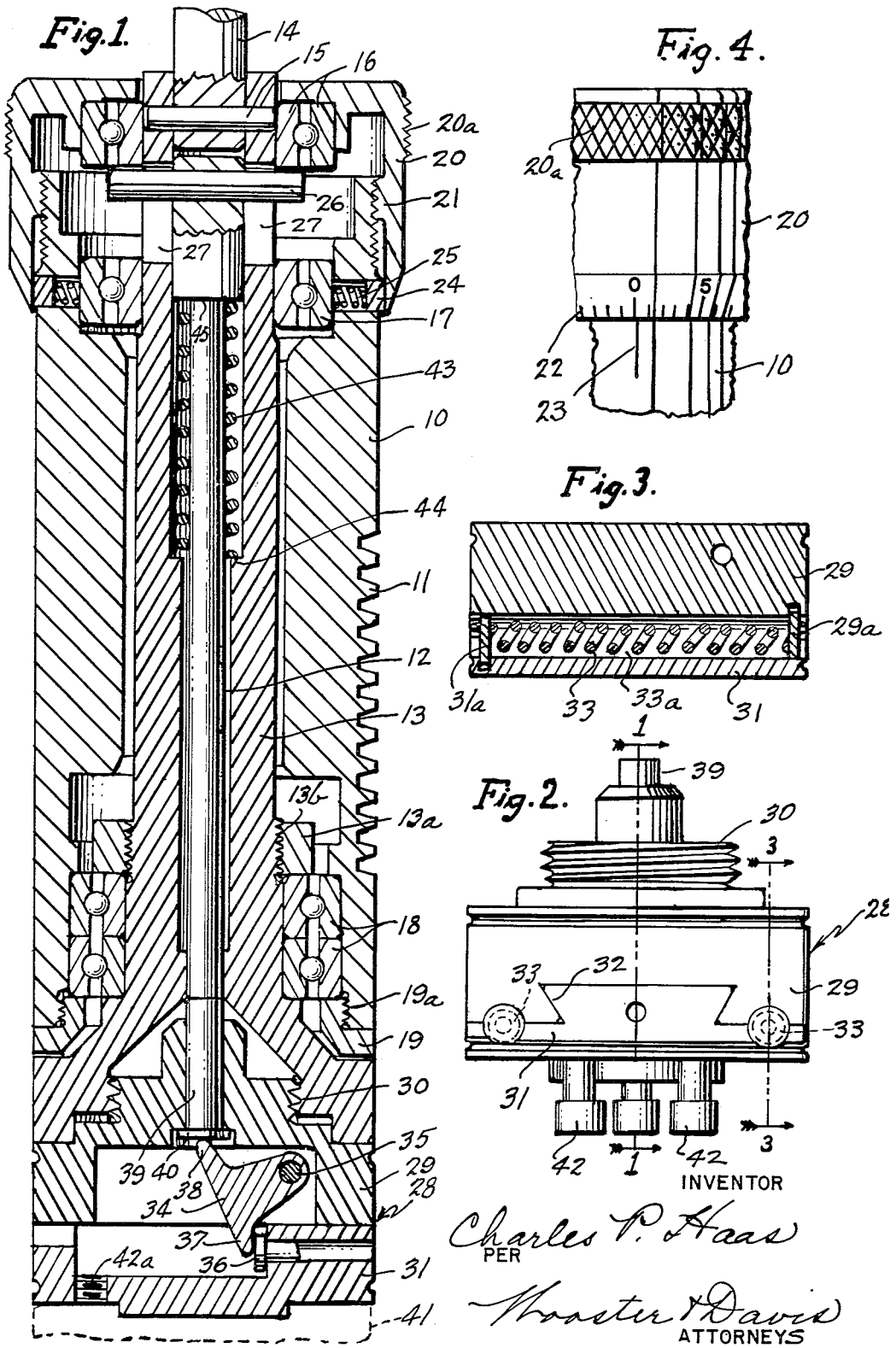
INVENTOR
Charles P. Haas
PER
Wooster & Davis
ATTORNEYS

United States Patent Office 2,745,668
Patented May 15, 1956

2,745,668

SPINDLE AND SLIDE CONTROL ASSEMBLY

Charles P. Haas, Bridgeport, Conn., assignor to Jigbore-Grind Machine Company, Inc., Westboro, Mass., a corporation of Massachusetts Application October 17, 1951, Serial No. 251,724

8 Claims. (Cl. 279—6)

This invention relates to a spindle and slide control assembly for machine tools, and has for an object to provide such an assembly which may be used as part of a machine, and when so used is adapted to secure an adjustment of an eccentric slide on a spindle carrying a tool while the spindle is in motion, and which slide can carry a tool for performing various machining operations such, for example, as to spot, drill, ream, tap, bore, counterbore, undercut, face, grind and lap, and the like, in sequence, for either cutting or abrasive operations.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a longitudinal section through the assembly as applied to the quill of a drill press but showing the device removed from the press;

Fig. 2 is a side view of the head and the eccentric slide or slide adapter unit removed from the quill and looking from the right of Fig. 1;

Fig. 3 is a detail section substantially on line 3—3 of Fig. 2, and

Fig. 4 is a partial side elevation of the upper end of the device and particularly the feed adjustment dial for the sleeve.

The device illustrated is shown, for example, as the spindle and quill of a drill press, but it is adapted for other machines having spindles driving a tool, including cutting and grinding tools and the like.

In the drawing, 10 is the quill of a drill press shown removed from the press, and which does not rotate but is adjustable up and down in the usual guides or heads of the drill press by the usual pinion or gear (not shown) meshing with the rack 11 in one side of the quill and operated, for example, by the usual feed handle (also not shown).

Within the quill is a plunger 12 slidable vertically or longitudinally in a rotatable spindle or hollow shaft 13, and this shaft is rotated or driven by the drive shaft 14 driven from the usual drive for the press. The spindle 13 is connected to the drive shaft 14 by the transverse pin 15 so that the shaft 14 will drive the spindle 13. This spindle 13 is mounted at its upper end in the ball bearings 16 and 17 and at its lower end in the ball bearings 18. The bearing 17 is mounted in the upper end of the quill 10, while the bearings 18 are mounted in the lower end of this quill and are held in position by the clamping ring 19 threaded in the spindle at 19c. The inner rings of these bearings are secured on spindle 13 by clamping ring 13a threaded on the spindle at 13b. On the upper end of the quill 10 is mounted the feed sleeve or adjuster 20 threaded to the quill at 21 so that it may be adjusted up and down or longitudinally of the quill, and it is provided with a graduated scale 22 on its lower end to indicate the amount of adjustment in combination with a suitable gauge line 23 on the outer surface of the quill. The sleeve 20 may have a roughened or knurled surface 20a to facilitate turning the sleeve. A brake shoe 24 mounted in the quill is pressed against the inner side of the sleeve 20 by springs 25 to frictionally hold the sleeve 20 in adjusted positions, but permits the sleeve to be turned for adjustment of the device even while the spindle 13 is running, so that it is not necessary to stop the spindle or the shafts 14 and 13 during the adjusting operations. The upper bearing 16 is carried by the sleeve 20 and at its lower side rests against the transverse pin 26 which is mounted in the plunger 12 and passes through elongated slots 27 in the sleeve or shaft in the spindle 13 so that the pin 26 can move up or down with the bearing 16 and the adjusting sleeve 20 and carry with it the plunger 12.

At the lower end of the spindle 13 is mounted a slide adapter unit 28. This comprises a body member 29 threaded at 30 into the lower end of the shaft or spindle 13. It carries a transversely shiftable slide 31 mounted in a transverse dovetail 32. Two springs 33 tend to shift this slide backwardly or to the left, as shown in Fig. 1, or that is, retract it against the cam 34 pivotally mounted in the body 29 at 35. The springs 33 may be mounted in transverse passages 33a formed partly in the body 29 and partly in the slide 31, and the springs abut stops 29a and 31a at their opposite ends mounted in the body 29 and slide 31 respectively. Mounted in the slide 31 is an abutment 36 against which presses a lug 37 of the cam 34. Another lug 38 of the cam abuts the lower end of a short push rod 39 mounted for vertical sliding movement in the body 29 and provided with a head or stop flange 40 at its lower end. This whole unit 28, including the body 29, slide 31, cam 34 and pushrod 39 may be removed from the spindle 13 by merely unscrewing it from this spindle. The lower end of the plunger 12 rests against the top end of the push rod 39. The eccentric slide 31 carries any suitable cutting or grinding tool (not shown), any suitable holder for the tool used being indicated diagrammatically by dotted lines 41, mounted on the under side of the slide 31 by any suitable means such, for example, as the screws 42, threaded into tapped openings 42a in the slide 31, and, of course, this tool will be rotated with the spindle or shaft 13 as it is mounted on the lower end of this spindle. A spring 43 embraces the upper portion of the plunger 12 and acts at its opposite ends against the shoulders 44 and 45 on the spindle 13 and the plunger 12 respectively to tend to force the plunger upwardly and hold the pin 26 against the lower side of the bearing 16. It also raises the plunger 12 to permit the springs 33 to retract the slide 31 and carry any tool carried by it to the inner or retracted position.

In operation, turning of the sleeve 20 will adjust the slide 31 carrying the tool either in or out to vary the diameter of surface being worked. If, for example, the slide 31 and holder 41 carry a boring tool (not shown), this adjustment will vary the position of the boring tool and thus vary the size of the opening being bored, and this may be done while the spindle or shaft 13 and the tool-carrying unit 28 including slide 31 are rotating. It is therefore not necessary to stop the machine to make the desired adjustment of the tool. Thus, for example, if sleeve 20 is rotated to move it downwardly the amount of adjustment being indicated by the scale 22, it will shift the bearing 16 and the pin 26 downwardly. This will shift the plunger 12 downwardly, also shifting the push rod 39 downwardly, which acting against the lug 38 on the cam 34 will cause the lug 37 engaging the abutment 36 to shift the slide 31 carrying the tool to the right or outwardly as viewed in Fig. 1, or toward the observer as viewed in Fig. 2, and carry with it the tool, in this case the boring tool (not shown). Thus, for example, after boring an opening to a given size, the operator can merely turn the sleeve 20 while the shaft and mechanism are still operating and thus without stopping the machine adjust the boring tool outwardly for a larger size, and the amount of adjustment will be accurately indicated by the scale 22. Turning the sleeve 20 in the opposite direction will permit the plunger 12 to be shifted upwardly by spring 43, relieving pressure on the push rod 39, and permit the springs 33 in the head 29 to shift the tool-carrying slide 31 inwardly or in the opposite direction.

It will be seen from the above that this provides a simple and effective means for mounting the tool in the spindle of a machine tool. It may be assembled as a unit and mounted as such as part of a machine for performing various machining operations, and the tool may be quickly and easily adjusted by merely turning the adjusting sleeve 20 while the device is operating.

Having thus set forth the nature of my invention, I claim:

1. A spindle and slide control assembly comprising a quill to be mounted for longitudinal movement in a machine tool provided with a drive shaft, a rotatable shaft mounted in the quill, means at one end for connecting the latter shaft to the drive shaft, an adapter unit secured to the other end of the shaft including a slide movable radially of the shaft for carrying a tool, a plunger mounted for longitudinal sliding movement in the shaft, a pivoted cam in the unit connected with the slide to shift this slide, means connecting the plunger with the cam for operating this cam to shift the slide, an adjuster comprising a rotatable sleeve embracing and threaded to the quill at the opposite end thereof from the adapter unit for adjustment longitudinally of the quill, and an operative connection from the adjuster to the plunger for operating the plunger to shift the slide.

2. A spindle and slide control assembly comprising a quill to be mounted in a machine tool provided with a drive shaft, a rotatable shaft mounted in the quill, means for connecting one end of this shaft to the drive shaft, a transversely slidable tool slide at the opposite end of the shaft, a longitudinally movable plunger in the rotatable shaft, means connecting the plunger with the slide for shifting the slide laterally by longitudinal movement of the plunger, and an adjuster comprising a rotatable sleeve embracing and threaded on the quill for longitudinal adjustment and connected with the plunger for shifting this plunger to adjust the slide.

3. A spindle and slide control assembly comprising a quill to be mounted in a machine tool provided with a drive shaft, a rotatable shaft mounted in the quill, means for connecting one end of this shaft to the drive shaft, an adapter unit mounted on the other end of the shaft comprising a body member secured to the shaft and a laterally movable slide for a tool holder, a pivoted cam mounted in the body and provided with a lug engaging the slide to shift it, a plunger extending longitudinally of the shaft and slidable therein, said cam provided with another lug connected with the plunger for operation of the cam thereby to shift the slide, and an adjuster comprising a rotatable sleeve embracing and threaded on the quill for longitudinal adjustment and connected with the plunger for shifting this plunger to adjust the slide.

4. A spindle and slide control assembly comprising a quill to be mounted for longitudinal movement in a machine tool provided with a drive shaft, a rotatable shaft mounted in the quill, means for connecting one end of the shaft to the drive shaft, an adapter unit mounted on the other end of the shaft comprising a body member secured to the shaft and provided with a guide extending transversely of the shaft, a tool holder slide mounted on the guideway, a pivoted cam mounted in the body member and provided with a lug engaging a shoulder on the slide to shift this slide, a plunger mounted in and extending longitudinally of the shaft, means connecting the plunger with the cam for operating this cam to shift the slide, and an adjuster comprising a rotatable sleeve embracing and threaded on the quill for longitudinal adjustment and connected with the plunger for shifting this plunger to adjust the slide.

5. A spindle and slide control assembly comprising a quill to be mounted in a machine tool provided with a drive shaft, a rotatable shaft mounted in the quill, means for connecting one end of this shaft to the drive shaft, a transversely slidable tool slide at the opposite end of the shaft, a longitudinally movable plunger in the rotatable shaft connected with the slide for shifting it laterally, and an adjuster threaded on the quill for longitudinal adjustment comprising a sleeve embracing the end of the quill, a bearing carried by the sleeve, and a transverse pin carried by the plunger extending through longitudinal slots in the shaft and engaging the bearing to shift the plunger with adjustment of the sleeve.

6. A spindle and slide control assembly comprising a quill to be mounted in a machine tool provided with a drive shaft, a rotatable shaft mounted in the quill, means for connecting one end of this shaft to the drive shaft, a transversely slidable tool slide at the opposite end of the shaft, a longitudinally movable plunger in the rotatable shaft connected with the slide for shifting it laterally, spring means for shifting the plunger and slide in the opposite direction, an adjuster comprising a sleeve threaded on the quill for longitudinal adjustment and provided with an indicator scale on its free edge, a transverse pin carried by the plunger and projecting at its opposite ends through elongated longitudinal slots in the shaft, and a bearing carried by the adjuster engaging the pin to shift the plunger against action of the spring means.

7. The device of claim 5 in which there is a spring pressed brake shoe engaging the sleeve to frictionally hold it in adjusted positions.

8. A spindle and slide control assembly comprising a quill to be mounted in a machine tool provided with a drive shaft, a rotatable shaft mounted in the quill, means for connecting one end of this shaft to the drive shaft, an adapter unit mounted on the other end of the shaft comprising a body member having a threaded connection with the shaft and provided with a laterally extending guide means, a tool slide mounted on the guide means, a longitudinally slidable plunger in the shaft, a push rod mounted in the body member in position to be engaged by one end of the plunger, a pivoted cam mounted in the body member and provided with lugs engaging the other end of the push rod and a shoulder on the slide respectively for shifting the slide in one direction, spring means for shifting the slide and plunger in the opposite direction, and an adjuster comprising a rotatable sleeve embracing and threaded on the quill for longitudinal adjustment and connected with the plunger for shifting the slide.

References Cited in the file of this patent

UNITED STATES PATENTS

| 135,515 | Boult | Feb. 4, 1873 |
| 1,056,476 | Wennerstrom | Mar. 18, 1913 |
| 1,556,691 | Indahl | Oct. 13, 1925 |
| 2,009,822 | Thorsen | July 30, 1935 |
| 2,010,983 | Ferguson | Aug. 13, 1935 |
| 2,016,935 | Forward | Feb. 1, 1938 |
| 2,247,283 | Young | June 24, 1941 |

FOREIGN PATENTS

| 228,118 | Great Britain | June 18, 1925 |
| 526,073 | Great Britain | 1940 |
| 609,356 | Germany | Feb. 13, 1935 |
| 784,059 | France | Feb. 1, 1938 |
| 242,891 | Switzerland | 1946 |